UNITED STATES PATENT OFFICE.

MORITZ ULRICH, OF ELBERFELD, GERMANY, ASSIGNOR TO THE FARBEN-FABRIKEN, VORMALS FR. BAYER & CO., OF SAME PLACE.

DIOXYNAPHTHALINE-MONO-SULPHONIC ACID.

SPECIFICATION forming part of Letters Patent No. 444,679, dated January 13, 1891.

Application filed October 31, 1890. Serial No. 369,971. (No specimens.)

*To all whom it may concern:*

Be it known that I, MORITZ ULRICH, doctor of philosophy, a subject of the Emperor of Germany, residing at Elberfeld, Prussia, Germany, (assignor to the FARBENFABRIKEN, VORMALS FR. BAYER & CO., of Elberfeld,) have invented a new and useful Improvement in the Manufacture of Dioxynaphthaline-Mono-Sulphonic Acids, of which the following is a description.

My invention relates to the production of a new dioxynaphthaline-mono-sulphonic acid, called by me "dioxynaphthaline-mono-sulphonic acid S," by melting the so-called "alpha-naphthol-alpha-disulphonic acid S," described in the United States Letters Patent No. 333,034, of December 22, 1885, of the Schöllkopf Aniline and Chemical Company, in Buffalo, with caustic alkali.

In carrying out my invention practically I proceed as follows: Twenty pounds of the soda salt of the alpha-naphthol-alpha-disulphonic acid S, dissolved in sixty liters of water, are heated with thirty (30) pounds of caustic soda in a closed vessel under continuous stirring to 240° centigrade, till a sample shows that all naphthol-sulphonic acid is changed to dioxynaphthaline-mono-sulphonic acid. Then the melt is poured into a small quantity of water saturated with hydrochloric acid, and the acid solution boiled until all sulphurous acid is away. After cooling, the soda salt of the dioxynaphthaline-sulphonic acid crystallizes in small white leaves, which may be directly employed for the manufacture of a large scale of valuable azo dye-stuffs. The same result is obtained by using, instead of caustic soda, caustic potassium, or instead of a closed an open vessel.

The soda salt of my new dioxynaphthaline-mono-sulphonic acid, which I call "dioxynaphthaline-mono-sulphonic acid S," crystallizes from a common salt solution in small white leaves, which are easily soluble in water or in alcohol of eighty per cent., and differ essentially from the known isomeric dioxynaphthaline-mono-sulphonic acids by its reaction to diazo or tetrazo compounds. With diazo-benzene or its homologues the salts of my new dioxynaphthaline-mono-sulphonic acid S form dye-stuffs which are similar in their shade to acid magenta, but exceed it in their fastness to light and air. With the tetrazo compounds of ortho-toluidine or dianisidine azo coloring-matters are formed which dye unmordanted cotton a bright blue. With perchloride of iron my new dioxynaphthaline-mono-sulphonic acid S gives a dirty-green deposit, and with some drops of perchloride of lime a changeable-green solution, the latter being decolorized by using an excess of perchloride of lime.

The dioxynaphthaline-mono-sulphonic acid S has the following composition:

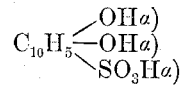

Having thus described my invention and in what manner it can be performed, that which I claim as new, and desire to secure by Letters Patent, is—

1. The process for producing a new dioxynaphthaline-mono-sulphonic acid or its salts by melting the salts of alpha-naphthol alpha-disulphonic acid S, as described, with caustic alkali in a closed or an open vessel.

2. As a new product of manufacture, the dioxynaphthaline-mono-sulphonic acid S, which has the following characteristics: The soda salt crystallizes in small white leaves which are easily soluble in water or alcohol of eighty per cent.; by adding perchloride of iron to a watery solution a dirty-green deposit, and with some drops of perchloride of lime a changeable-green solution, is formed, the latter being decolorized by using a surplus of perchloride of lime; the new acid or its salts gives with diazobenzene a new azo dye-stuff similar in shade to acid magenta, and with ortho-tetrazo-ditolyl or tetrazo-diphenyl ethers direct dyeing coloring-matters of bright-blue shades. The acid has the following chemical formula:

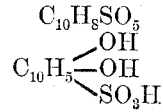

MORITZ ULRICH.

Witnesses:
C. R. FERGUSON,
WM. A. POLLOCK.